United States Patent Office 3,360,865
Patented Jan. 2, 1968

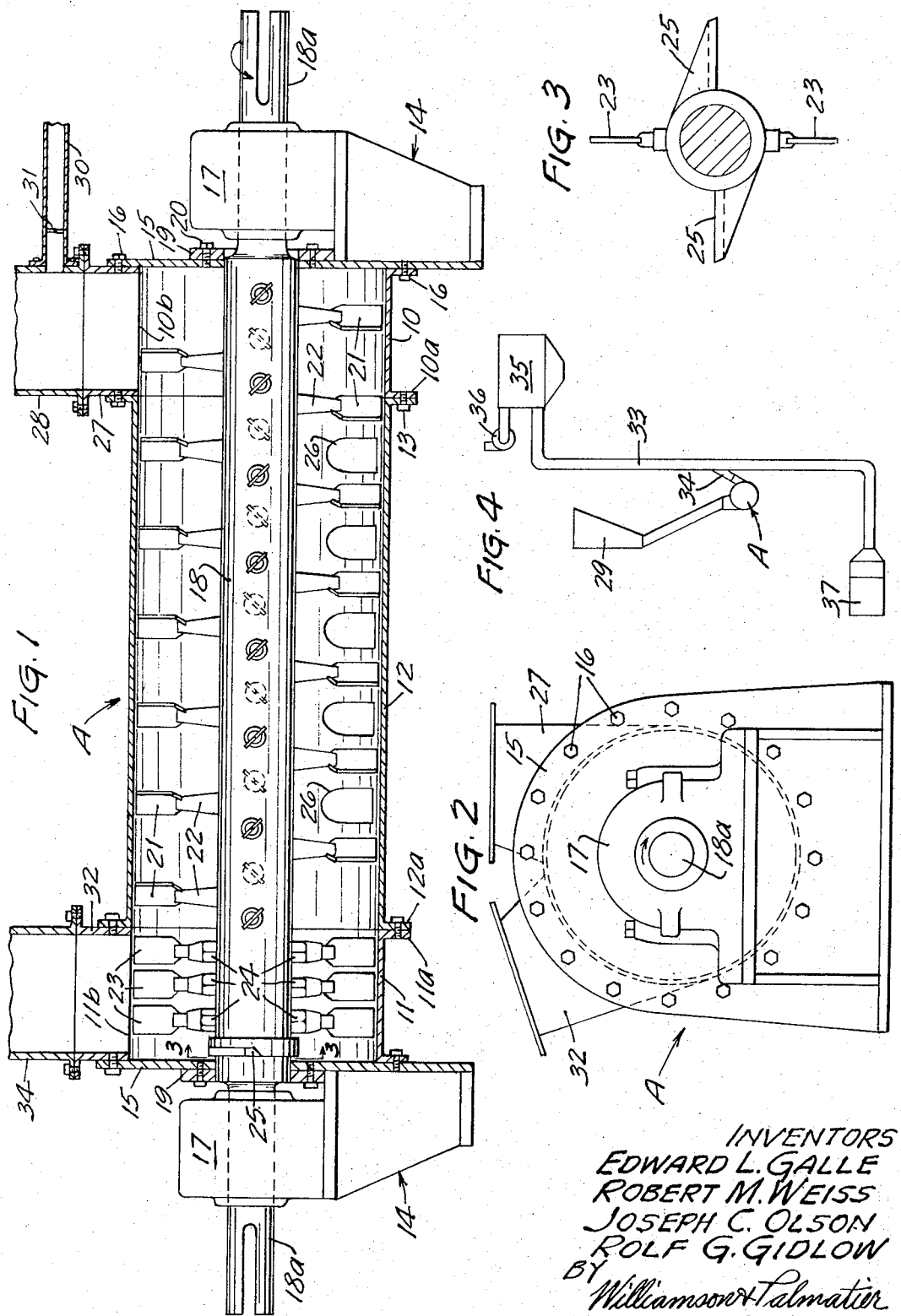

3,360,865
PROCESS AND APPARATUS FOR AGGLOMERATING AND DRYING FLOUR
Edward L. Galle, St. Paul, Robert M. Weiss, Minneapolis, Joseph C. Olson, Shakopee, and Rolf G. Gidlow, North St. Paul, Minn., assignors to The Pillsbury Company, Minneapolis, Minn., a corporation of Delaware
Filed Feb. 8, 1965, Ser. No. 431,110
15 Claims. (Cl. 34—10)

This invention relates to novel process and apparatus for agglomeration of pulverulent material in general, and in particular, to the self-agglomeration of cereal flours, into randomly clustered groups of particles to form free flowing penetrable porous agglomerates which are more readily wettable and dispersible in a liquid than the same material in unagglomerated form.

Flour, in its usual form, is naturally difficult to handle and package, is dusty, dry, powdery, is not free flowing, does not pour easily, tends to cake or ball in large masses which a liquid has difficulty in penetrating to effect thorough wetting of all the particles, and is for the most part exceedingly difficult to uniformly disperse in liquids such as when making batters, gravies and the like. Also, flour must usually be sifted when being measured to permit uniform measuring thereof because of varying density and packing. Virtually every cook and flour user is well aware of the difficulty with which flour is formed into a batter or dough due to the tendency of the fine powdery flour particles to collect in lumps or masses in a liquid used to form the batter, with the lumps or masses of flour being virtually inpenetrable by the liquid, thereby materially delaying the wetting of the flour comprising the interiors of these lumps or masses until such time as the lumps are broken up and disintegrated by vigorous mechanical agitation such as provided by stirring or beating. The flour industry has long sought to remedy the aforementioned deficiencies and improve the physical characteristics of flour.

The aforementioned undesirable characteristics of flour in its usual fine powdery form can be corrected and improved by agglomerating the flour in the novel manner of this invention described hereinafter.

The course of action taught herein has particular applicability to flour products which do not have some other soluble functional binding material incorporated therewith to act as the means for binding the particles of the product together in the form of agglomerates, or, to say it another way, relates primarily to flour mixtures in which flour substance or flour itself must function as the primary means for bonding all of the particles of the mixture together or to plain flour in which the flour particles are directly adhered to one another (self-bonded) instead of being coupled together by an intermediate foreign binding material.

Thus, this application relates particularly to the agglomeration of plain cereal flours such as are made from wheat and the like, and mixtures of flour and one or more other ingredients which are either in and of themselves incapable of functioning as a binder under any circumstances or which are present in insufficient amounts to effectively act as a binder to agglomerate or tie the particles constituting the mixture together, there being enough flour present in said mixtures to enable substantially the entire mixture to be agglomerated with the flour serving as the primary bonding agent.

Therefore, the object of this invention is to remedy the problems set forth hereinbefore and includes providing novel and commercially successful means and methods for effecting the agglomeration of pulverulent material in general, and in particular, for the agglomeration of flour and mixtures thereof into porous, free flowing, substantially dustless, more readily wettable granular agglomerates having sufficient strength to withstand the rigors of subsequent handling, packaging, storing and shipment and agglomerated flour having a sufficiently stable bulk density to permit measuring thereof without shifting on a cup-for-cup basis with unagglomerated flour, in a manner and by means to be set forth in more detail hereinafter.

FIG. 1 is a vertical longitudinal sectional view of apparatus constituting one embodiment of this invention;

FIG. 2 is an end elevational view of the apparatus of FIG. 1 as viewed from the left (discharge) end thereof;

FIG. 3 is a cross-sectional view of FIG. 1 taken approximately on the line 3—3 thereof;

FIG. 4 is a schematic view of a portion of a system incorporating the apparatus of claim 1.

The process of this invention broadly comprises admitting the pulverulent material to be agglomerated to a treatment chamber, and while in said chamber wetting the material to a degree sufficient to cause the surfaces of the particles to become adhesive or sticky, and agitating the wetted adhesive particles to cause them to make random contact with each other, whereupon they stick together in clusters and form porous agglomerates.

More specifically, the treatment chamber is provided with a bladed agitator, and a stream of air which continuously passes therethrough, the material being conveyed through the chamber by the combined action of the air stream and the agitator, the agitator also serving to disperse the particles in the chamber to expose all of them to the moisture therein and to accomplish uniform wetting thereof and uniform moisture distribution therethroughout, and to cause the particles to make random contact and agglomerate after wetting thereof. The wet agglomerates are then preferably dried by pneumatically conveying them in a stream of drying air from the treatment chamber to any suitable means for collecting the dried agglomerates, said agglomerates being reduced to their desired moisture level by the time they reach the collecting means.

The broad process of this invention as it applies to the treatment of flour comprises moisturizing or wetting the particles of the flour containing material to be agglomerated to hydrate the protein in the flour particles to an extent sufficient to cause the flour protein to become sticky, tacky or adhesive to enable the hydrated protein to act as a bonding agent to bind or stick together the particles of the flour containing material to be agglomerated when they are brought into random contact with one another. The moisturized particles with the adhesive flour protein are then agitated and caused to come into random contact with one another and stick to one another and effect a build-up of particles into randomly clustered more readily wettable agglomerates, the particles being firmly held together by the adhesive flour protein. When the agglomeration of the flour containing material has been completed, the agglomerates are subjected to a drying operation to remove the excess moisture therefrom and to strengthen and rigidify the agglomerates in order to enable them to better withstand the rigors of subsequent handling, packaging and transportation, and to drive off sufficient moisture to eliminate the sticky or tacky condition of the material, and keep the flour from molding and spoiling. The entire process is preferably carefully controlled, particularly with regards to moisture and temperature to avoid any significant gelatinization of the starch in the flour.

The agglomerates which are formed by the aforementioned method are characterized by the randomly clustered arrangement of the particles which are in substantially point surface contact with each other and which are strongly adhered to one another in random fashion by the flour protein and which are further characterized by the large number of very small fine interstices, voids or spaces between the unadhered portions of the particles, providing openings or perforations or capillary type passageways extending inwardly from the exterior thereof. The number of said voids is of about the same magnitude as the number of individual particles comprising the agglomerates providing an irregular rough penetrable exterior of irregular non-symmetrical shape and a large exposed surface area in comparison to the size of the agglomerates which improves the ability of a liquid to more rapidly penetrate and wet the particles making up the agglomerates to hasten the formation of the batter or dough in a shorter space of time than is possible with the same material in unagglomerated form and with less effort and inconvenience, since the agglomerated flour containing material of this invention does not form lumps or masses whose wetted surfaces shield the dry interiors from liquid penetration and wetting thereof, as does the same material in unagglomerated form.

The adhesive protein bond between the agglomerated particles is a relatively strong one and of such nature that the agglomerated product is quite capable of maintaining its agglomerated form through the rough treatment usually associated with the packaging, shipping and other customary handling of flour products.

The agglomerates of this invention are further characterized by being substantially uniform in size, virtually dustless and generally granular in nature and capable of being volumetrically measured and used without sifting, and generally uniform in nature throughout.

It is normally undesirable to hydrate the flour to a degree beyond that necessary to cause the protein to become sufficiently adhesive to effect proper agglomeration of the material. Moisture in excess of this amount adds nothing of value to either the method or the product, and, in fact, has several disadvantages. Excess moisture excessively glutenizes the flour, making it an inferior product less suitable for most food products made from flour, and makes for a less efficient process since it places a heavier and unnecessary load on both the moisturizing and drying equipment. Thus, according to the invention, enough moisture is added to cause the flour protein to become sufficiently adhesive to bind the particles together, and the moisture level and temperature are preferably controlled to prevent gelatinization and excessive glutenization of the flour.

The moisturization of flour material is preferably accomplished by dispersing the particles to be agglomerated in a humid atmosphere provided by a finely divided or atomized spray of liquid water (or liquid water and steam) for a period of time sufficient to hydrate and make adhesive the flour protein to the extent necessary to cause sticking together and agglomeration of the particles when they are brought into random contact with one another. The moisture is deposited on the particles by direct contact thereof with the drops of liquid, and by condensation of liquid on the particles from any condensible vapor present. By this method, substantially all the particles are supplied with surface moisture and the material is substantially uniformly wetted throughout, whereby the wetted particles can be made to adhere to each other at will by bringing them into random contact with each other, thereby imposing no practical limitations on the size of the final agglomerates. Materials other than flour can oftentimes be successfully agglomerated by admitting only a condensible vapor such as steam to the treatment chamber, in which case the particles are wetted and made adhesive by the condensation of a thin film of moisture on the surfaces thereof.

The protein and starch constituting the flour particles are intimately admixed and the protein is not easily moisturized and rendered adhesive. To effect as rapid a moisturization of the flour and development of adhesive flour protein as possible, the particles of flour and water are preferably subjected to vigorous agitation and turbulence to disperse the particles in close proximity to one another and to cause a high frequency of contact between the flour and water to provide rapid wetting of the particles, the rate of wetting in this case being directly related to the frequency of contact between the flour and the water and thereby directly related to the degree of agitation.

Once the flour particles have been moisturized to an extent sufficient to provide adhesive surfaces, they are then brought into contact with one another by maintaining them in dispersed condition while in close proximity and agitating the particles, the particles when making contact with one another adhering to each other because of the adhesive nature of the moisturized protein present on the surface of the particles.

The rate at which the glutenized flour particles are agglomerated is also related to the frequency of contact of the adhesive particles and it is therefore preferable from an efficiency standpoint to vigorously agitate the wetted particles and cause a high rate of frequency of contact therebetween.

One factor which influences the character of the agglomerated product itself is the force or pressure with which the wetted particles make contact. If the particles are thrown together with relatively large impact, the particles of the resulting agglomerates are more tightly grouped and clustered and the agglomerates have a higher density than the agglomerates of the same material agglomerated with less impact and force of contact. Thus, the bulk density and strength of the agglomerates increases as the force of impact or contact increases.

An example of equipment which will successfully agglomerate plain flour or flour mixtures of the type contemplated by this invention, as well as other agglomerable material, is illustrated in FIG. 1 of the accompanying drawings.

The apparatus disclosed therein comprises an agglomerator A which includes an agglomerating chamber formed by a cylindrical inlet drum 10 and a cylindrical discharge drum 11 which are interconnected by a cylindrical center agglomerating drum 12, said three drums being of the same cross-sectional size, co-axial, and in flow communication with one another. The ends of the three drums are provided with flanges 10a, 11a and 12a respectively, the center drum being secured to and supported by end drums 10 and 11 by means of bolt fasteners 13 which extend through and between the opposing abutting flanges of said drums.

The inlet and discharge drums are supported by a pair of identical supporting base units 14, each of which includes a vertical apertured drum supporting plate 15 which closes the outer end of its respective drum and is secured to the outer flange thereof by means of bolt fasteners 16. Thus, the three drums combinatively provide a tubular chamber through which the material to be treated is longitudinally conveyed, and in the course of its passage therethrough is dispersed, agitated, moistened and agglomerated in a manner hereinafter described. The sectional formation of this chamber facilitates the disassembly thereof for purposes of cleaning and servicing same.

Each of the bases has mounted thereon a pillow block 17 for journaling and rotatably supporting the agitating unit as described hereinafter. An agitator or mixer is rotatably mounted in the agglomerating chamber and comprises an elongate shaft 18 extending axially the full length thereof and through the plates 15 and having reduced end portions 18a extending outwardly therefrom which are supported by the aforementioned pillow blocks and which are adapted to be connected to and driven by any suitable driving means (not shown). Each end of the shaft is provided with a seal 19 which encloses same and is secured to the outer face of its respective supporting plate 15 by means of fasteners 20.

The shaft has mounted thereon a multiplicity of radially extending material agitating and dispersing blades 21 which are angularly offset (when viewed in plan) from the longitudinal axis of the shaft, preferably at an angle of about 45 degrees, although this angle may vary within the range of 30–60 degrees. These blades are removably mounted on the shaft by means of tapered shanks 22, and are mounted on that portion of the shaft which extends from the outer end of the inlet drum to the inner end of the discharge drum.

In the illustrated version, there are four rows of these blades, each row being angularly offset 90 degrees from each adjacent row about the shaft circumference. The blades in these four rows are combinatively arranged in substantially equispaced series longitudinally of the shaft, with adjacent blades in the series being offset 90 degrees from each other and successively spirally arranged about the shaft circumference. In one preferred form, the blades in the inlet drum 10 are spaced slightly further apart than those in the center agglomerating drum 12. These blades are all oriented in the same direction with respect to the shaft and arranged on the shaft so as to convey material longitudinally of the treatment chamber from the inlet drum to the discharge drum.

The portion of the shaft 18 located in the discharge drum is provided with two diametrically opposed rows of radially extending fan blades 23 which are in alignment with the longitudinal axis of the shaft when viewed in plan. In the illustrated version, there are three fan blades 23 in each row, said blades being removably mounted on the shaft by means of shanks 24. These two rows of blades function as fan or impeller means for blowing the agglomerated material out of the discharge drum and for inducing a draft or current of air through the agglomerator.

A pair of radially extending cleaning blades 25 are also mounted on the shaft 18 between the fan blades and the outer end wall of the discharge drum (inner face of plate 15) and in close contiguous relationship with said wall. These blades lie in a plane perpendicular to the longitudinal axis of shaft 18 and prevent the build-up or accumulation of any material on the inner face of the outer end wall of the discharge drum and see to it that all the material entering the discharge drum is discharged therefrom.

Moisture is admitted to the center drum through one or more ports or openings 26 provided in and arranged in series longitudinally of the wall thereof. Moisture is supplied to these ports from any suitable source by any suitable means (not shown).

To admit material to the agglomerating chamber, the top of the drum 10 is provided with an inlet or feed opening 10b to which material is fed through an upstanding feed chute 27 attached to the drum and in communication with said opening. Said chute is supplied with material from a conduit 28 which is attached thereto, and which receives material from a supply hopper 29 which is schematically illustrated in the flow diagram of FIG. 4.

To supply additional air to the agglomerator, the material supply conduit 28 has an air supply conduit 30 attached thereto and in flow communication therewith, the conduit 30 being provided with a valve 31 for selectively controlling the flow of air therethrough for a purpose and in a manner described in more detail hereinafter.

To remove the agglomerated material from the agglomerator, the top of the discharge drum is provided with a discharge opening 11b and a generally upstanding chute 32 attached to said drum and in communication with said opening through which opening and chute the agglomerates are impelled by the fan blades 23.

To dry the wet agglomerates issuing from the agglomerator, a drying duct 33 is provided as shown in FIG. 4 through which duct a stream of heated air is passed, the wet agglomerates being admitted to said duct from a conduit 34 connecting chute 32 with duct 33. The illustrated drying system includes a collector 35 located at one end of duct 33 for receiving the dried agglomerates therefrom, said collector having a fan 36 in communication therewith for pulling heated air from a furnace 37 located at the other end of duct 33 through said duct and collector. The wet agglomerates are pneumatically conveyed by said heated air through duct 33 to collector 35, and are reduced to the desired moisture level by the time they reach the collector. The size of the drying duct 33 and the volume of drying air passing therethrough is preferably such that the wet agglomerates are loosely dispersed and scattered in the air stream and separated as much as possible so that they make minimum contact with each other in the course of their travel through the drying duct to the collector.

In operation, the dry material to be agglomerated is fed to the inlet drum 10 of the agglomerator from hopper 29, and if desired, mixed with additional air from duct 30 immediately prior to entering the agglomerator. As the dry material enters the inlet drum, it is conveyed axially of the inlet and center drum by means of blades 21 and air flowing through the agglomerator towards the discharge drum. The blades 21 also disperse and agitate the particles and cause them to make repeated random contact with each other.

As the material passes through the agglomerator, it is wetted or moisturized by a spray of water or water and steam (or some other suitable wetting agent capable of forming adhesive surfaces on the particles) injected into the center drum through the ports 26. Due to the agitation of the blades, the particles are dispersed in the wet atmosphere and thoroughly and intimately admixed with the water particles and/or condensible vapor constituting same and are thereby wetted sufficiently to become adhesive and randomly adhere to one another and combine into the desired agglomerates through repeated contact with one another. When flour is so treated, enough moisture is added to cause the protein to become adhesive and serve as the bonding agent.

By the time the material in the agglomerator reaches the discharge drum 11, the particles have been combined into the desired agglomerates, which agglomerates are discharged from the agglomerator and the discharge drum through the discharge opening 11b thereof by the action of the fan blades 23 and the current of air caused thereby. The wet agglomerates are pneumatically conveyed through chute 32 and connecting duct 34 to the drying duct 33, through which they are then pneumatically conveyed by the stream of heated air passing therethrough to the collector 35, and in the course of their travel through duct 33 are dried to the desired moisture of the agglomerated product by the heated air conveying them therethrough.

In the illustrated arrangement, the air-flow through the agglomerator is controlled by the suction in the drying duct, the mixer fan blades, and the valve in the air supply conduit. However, other suitable means may be provided for effecting the desired air flow through the agglomerator.

This pneumatic conveying of the wet agglomerates and the resultant drying thereof is a much more desirable and efficient form of drying than has heretofore been utilized in the agglomeration field. By so effecting the drying, there is very little, if any, destructive contact between the wet agglomerates during the drying thereof. Thus, they retain their size and shape as formed so that there will not be sticking of agglomerates together while wet to form oversize agglomerates and also prevents the breakdown of some of the wet agglomerates which might otherwise occur due to attrition between agglomerates, thereby resulting in undersized material which must be recycled.

The air flow through the agglomerator also materially contributes to the success of this invention. It prevents or minimizes the collection or build-up of wet sticky material on the walls of the agglomerator, thereby reducing the frequency of shutdown for cleaning. It reduces the needed power requirements, provides a higher percentage of product within the desired size range, and provides a measure of control over the quality and character (such as the bulk density) of the agglomerated end product.

Agglomerated flour can be made according to this invention so as to have the same or substantially the same loose (untapped) bulk density as the unagglomerated material from which it is formed (which is the same as the loose, untapped bulk density of the sifted unagglomerated flour). This is an unexpected result in view of the fact that known agglomerated products other than flour have a bulk density which is substantially less than the starting material from which they are formed. The fact that the agglomerated flour can be made so as to have the same bulk density as that of the starting material is of great importance since it enables the agglomerated product to be measured on a cup-for-cup basis with sifted unagglomerated flour. This ability to measure on a cup-for-cup basis is of special importance because the average housewife has many favorite recipes incorporating flour as one of the ingredients in which the amount of flour required in the formulation or recipe is expressed in certain volumetric measurements such as cups of sifted unagglomerated flour. Thus, by having an agglomerated flour of comparable bulk density to sifted unagglomerated flour, the housewife can use the same measurements when using the agglomerated product as she did or would when using the unagglomerated material. Thus, she can use the same recipes for both agglomerated and unagglomerated flour. Where there is a substantial variance in the bulk density between the agglomerated and unagglomerated material, the housewife must adjust her formulations and measurements when using the agglomerated or unagglomerated material, and such adjustments are frequently inaccurate as well as being time consuming and inconvenient. In situations where cup-for-cup measurement is not particularly important, then the operational conditions can be so adjusted as to provide an agglomerated product having a loose bulk density greater than the loose bulk density of the starting material and this increased bulk density is of importance since it enables the product to be shipped and stored in smaller containers, thereby materially reducing the cost of handling, transportation and storage.

The bulk density of the agglomerated product can be varied by, and is dependent in large part upon, certain operational conditions, including the air-flow through the agglomerator, the speed of the agitator, and the degree of moisturization.

When treating flour-containing material, according to this invention, the moisture content of the flour-containing material being agglomerated is preferably increased to a total level of about 24 to 32 percent during the formation of the agglomerates and prior to the drying step, with the optimum total moisture content of the wet agglomerates before drying same being about 27 to 29 percent.

Air is preferably drawn into the agglomerator through the feed inlet at a rate of 4 to 5 cubic feet per minute (c.f.m.) per pound of flour fed per minute. When determining the amount of moisture to be admitted to the agglomerator to raise the moisture level of the material to the desired level, extra moisture should be provided to humidify the air passing through the agglomerator. It has been found desirable to add an extra pound of water per minute to the agglomerator for each 400 to 500 c.f.m. of air entering the agglomerator. Flour normally has a moisture content of 14 percent or less. If the moisture content of flour having 14 percent moisture is to be increased to 28 percent in the agglomerator, water in the amount of 20 percent of the weight of the flour is admitted to the agglomerator to wet the flour, with an extra pound of water being added to humidify the air. Thus, if flour containing 14 percent moisture is fed to the agglomerator at a rate of 100 pounds per minute, and air is being admitted to the agglomerator at the preferred rate of 4 to 5 c.f.m. per pound of flour (400 to 500 c.f.m.), then 21 pounds of water per minute are admitted to the agglomerator (20 pounds to wet the flour and 1 pound to humidify the air) to increase the moisture level of the flour in the agglomerator to 28 percent. The agitator or mixer is preferably operated within the range of 500 to 4800 r.p.m.'s, with 2000 to 3000 r.p.m.'s being considered optimum. The wet agglomerates are preferably dried to a moisture level of 14 percent or less. Any suitable drying conditions and temperatures may be employed, but the drying temperature is preferably maintained low enough to avoid gelatinization of the flour. A drying temperature of about 250 degrees F. has been found to be effective.

An example of one preferred method of agglomerating flour according to the method, system and apparatus of this invention to form an agglomerated product having the same loose bulk density as that of the unagglomerated starting material is as follows:

Wheat flour was fed into an agglomerator A having a 14-inch diameter treatment chamber or tube at a rate of 100 pounds per minute, which material contained 14 percent moisture. Water was admitted to the center agglomerating drum 12 through ports 26 at a rate of 21 pounds per minute. The bladed agitator or mixer was rotated at 2500 r.p.m.'s, and air was drawn into the agglomerator through the feed chute 27 at a rate of 400 to 500 c.f.m. The wet agglomerates issuing from the agglomerator contained 28 percent moisture and were dried in a stream of heated air in duct 34, the air-flow in said duct measured just before the point of admission of the wet agglomerates thereto being about 25,000 c.f.m. and 250 degrees F. The dried agglomerated product, containing about 14 percent moisture, had a loose bulk density of 118 to 120 grams per cup, which bulk density corresponded to the loose bulk density of the unagglomerated starting material.

The degree or extent of agglomeration (that is the number of individual particles in the average agglomerate) is a function of the particle concentration in the agglomerating chamber, the degree of turbulence or particle activity, and the duration of the mixing or agglomerating time. The agglomerated flour product of this invention is preferably finer than 351 microns and coarser than 110 microns.

Thus, this invention includes the use of pneumatic means, more specifically a forced draft of air, in the agglomeration or pulverulent material, in the drying of the wet agglomerates, and in the conveyance of the material being treated through the agglomerator and from the agglomerator to suitable collection means for the agglomerated end product. The illustrated embodiment comprises a continuous system in which the material is admixed with a forced draft of air from the time it enters the agglomerator until it is deposited in agglomerated form in the collection means. Thus, there is a draft of forced air which continuously enters the agglomerator with the material, passes through the agglomerator while the material is being agglomerated therein, leaves the agglomerator with the agglomerates entrained therein, passes through the connecting duct with the agglomerates entrained therein, and enters the drying duct with the agglomerates, where the agglomerates are dispersed in the drying air and conveyed thereby to the collector. The term "forced draft" as used herein includes, unless otherwise indicated, both air currents pushed under pressure through the system and air currents induced or drawn through the system by suction, or a combination of both. It will also be understood that the invention includes within its scope a drying system in which the wet agglomerates fall freely downwardly by force of gravity through a drying duct in which the agglomerates are dispersed in a stream of upwardly moving drying air, and in fact contemplates any drying system in which the wet agglomerates are maintained in a dispersed condition in a stream of drying air during their course of travel from the agglomerator to a receptacle for dried agglomerates without being repeatedly thrown against one another or against the conveying structure such as the walls of the duct. Thus, in the drying process of this invention, contact between the agglomerates themselves and the agglomerates and the conveying structure is preferably eliminated or reduced to an absolute minimum by dispersing the agglomerates in the stream of drying air and surrounding the individual agglomerates with a cushion of drying air during substantially the entire time they are being dried and are traveling from the agglomerator to the receptacle or collection means for the dried agglomerates.

It will, of course, be understood that various changes may be made in the form, details, arrangement and proportion of the various parts without departing from the scope of the invention.

What is claimed is:

1. A method of agglomerating pulverulent flour base material comprising dispersing and agitating said material in a treatment chamber so that the particles of said material make repeated random contact with each other, wetting the dispersed agitated particles with sufficient moisture to cause the flour protein to become adhesive whereby the wetted particles stick together and form agglomerates, and producing a stream of air and continuously passing it through said treatment chamber and the material being treated therein to pneumatically convey said pulverulent flour base material through said treatment chamber.

2. A method of agglomerating pulverulent material comprising continuously moving said material through a treatment chamber along a predetermined path of travel, dispersing and agitating said material in said treatment chamber in a continuous stream of air moving in the general direction of movement of said material so that the particles thereof make repeated random contact with each other, and wetting said dispersed agitated particles and thereby causing them to become adhesive whereby the wetted particles form agglomerates when they make random contact with each other, and discharging wet agglomerates from said chamber to a duct, entraining said agglomerates in a stream of air in said duct and thereby pneumatically conveying said agglomerates through said duct to a receptacle, and drying said agglomerates in the course of their travel through said duct.

3. The method of claim 2, wherein said drying is accomplished by entraining said agglomerates in said duct in a stream of air capable of removing moisture from said agglomerates.

4. A method of agglomerating pulverulent flour base material comprising feeding the material to be agglomerated into one end of an elongated mixing chamber, dispersing and agitating said material in said chamber and moving it continuously therethrough by means of a bladed mixer having a plurality of spirally arranged blades thereon which are adapted to convey the material longitudinally of said chamber and cause the particles of said material to make repeated random contact with each other, wetting the dispersed agitated particles in said chamber with sufficient moisture to cause the flour protein to become adhesive whereby the wetted particles stick together and form agglomerates when they make random contact, the moisture content of the material being thereby increased to a total of between about 27–29%, producing a stream of air and continuously passing it longitudinally through said chamber and the material being treated therein in the direction of movement of said material, and discharging the agglomerates formed in said chamber from the other end thereof, wherein the mixer is rotated at a speed of 2000–3000 revolutions per minute, and said air is admitted to said chamber at the rate of about 4 to 5 cubic feet per minute per pound of material admitted per minute to said chamber.

5. Apparatus for agglomerating pulverulent material comprising a treatment chamber having an inlet opening for admitting unagglomerated material thereto and a discharge opening for discharging agglomerated material therefrom, means for mechanically conveying material from said inlet opening to said discharge opening, means for propelling a gas through the treatment chamber for pneumatically conveying material from said inlet opening to said outlet opening, means for dispersing and agitating material in said chamber, means for wetting the dispersed agitated material in said chamber sufficiently to cause same to agglomerate therein, means for simultaneously expelling said material and said gas from said apparatus at the same location with the material uniformly distributed within the gas when expelled and duct means communicating with the discharge opening to maintain the gas at all times in contact with the pulverulent material.

6. The apparatus of claim 5, including duct means adapted to receive wet agglomerates issuing from the discharge opening of said chamber, means for producing a stream of air in said duct means capable of drying said agglomerates and pneumatically conveying them through said duct, and collection means for receiving the dried agglomerates from said duct.

7. Apparatus for agglomerating pulverulent material comprising a treatment chamber having an inlet opening for admitting unagglomerated material thereto and a discharge opening for discharging agglomerated material therefrom, a rotatable mixer mounted in said chamber adapted to disperse and agitate material in said chamber and convey said material from the inlet opening to the discharge opening, means for wetting the dispersed agitated material in said chamber sufficiently to cause same to agglomerate therein, a receptacle for collecting dried agglomerates, duct means for carrying agglomerated material from the discharge opening of said chamber to said receptacle, draft-producing means causing air to flow through said chamber and the material being treated therein to said discharge opening, and means for producing a stream of air in said duct means capable of drying the agglomerated material therein and pneumatically conveying it through said duct means to said receptacle.

8. The apparatus of claim 7, wherein said draft-producing means includes fan means mounted in said chamber adjacent the discharge opening thereof, said fan means being operatively connected with said mixer for simultaneous operation thereof, said fan means being adapted to draw air through said chamber and the material therein from the inlet to the discharge opening of said chamber.

9. The apparatus of claim 7, wherein said rotatable mixer comprises a rotatable shaft having a plurality of blades spirally arranged thereon and diagonally oriented with respect to the longitudinal axis of said shaft, and wherein said draft-producing means includes a plurality of fan blades mounted on said shaft adjacent said discharge opening and adapted to draw air through said chamber from the inlet to the discharge opening thereof.

10. Agglomerating apparatus comprising an elongate substantially horizontally oriented cylindrical drum, said drum having material and air inlet and outlet openings formed therein and spaced longitudinally thereof, a rotatable shaft mounted in said drum and extending longitudinally thereof, means carried by said shaft adapted to convey pulverulent material from the inlet opening to the discharge opening and simultaneously disperse and agitate said material, means for wetting the dispersed agitated material in said chamber sufficiently to cause same to agglomerate therein, and fan means mounted on said shaft adapted to cause air to flow in through said material and air inlet then through said chamber and the material being treated therein towards said discharge opening and both said material and said air being expelled through said outlet opening.

11. The apparatus of claim 10, wherein the inlet opening is so arranged that the material enters the drum tangentially thereof, and wherein the discharge opening is so arranged that the material is discharged tangentially from said drum.

12. The apparatus of claim 10, wherein the conveying means comprise a plurality of blades mounted on said shaft and extending radially therefrom, said blades being diagonally disposed with respect to the longitudinal axis of the shaft and spirally arranged thereon, said fan means being disposed adjacent the discharge opening and adapted to draw air through said chamber and the material being treated therein from the inlet opening to the discharge opening.

13. The apparatus of claim 10, including blade means mounted on said shaft in contiguous relationship with the end wall located on the discharge end of said drum, said blades being adapted to remove any wet agglomerates which might stick to said end wall.

14. Apparatus for agglomerating pulverulent material comprising a treatment chamber having an inlet opening for admitting unagglomerated material thereto and a discharge opening for discharging agglomerated material therefrom, means for conveying material through said chamber from said inlet opening to said discharge opening including draft-producing means for causing air to flow through said chamber and the material being treated therein in the direction of movement of said material, means for dispersing and agitating material in said chamber, and means for wetting the dispersed agitated material in said chamber sufficiently to cause same to agglomerate therein and said draft-producing means including fan means mounted in said chamber intermediate the inlet and discharge openings thereof and adapted to draw air through said chamber from said inlet opening.

15. Apparatus for agglomerating pulverulent material comprising a treatment chamber having an inlet opening for admitting unagglomerated material thereto and a discharge opening for discharging agglomerated material therefrom, means for conveying material through said chamber from said inlet opening to said discharge opening including draft-producing means for causing air to flow through said chamber and the material being treated therein in the direction of movement of said material, means for dispersing and agitating material in said chamber, and means for wetting the dispersed agitated material in said chamber sufficiently to cause same to agglomerate therein, and a receptacle for receiving dried agglomerates, duct means adapted to receive wet agglomerates issuing from the discharge opening of said chamber and convey them to said receptacle, and means for producing a stream of air in said duct means capable of drying said agglomerates.

References Cited

UNITED STATES PATENTS

| | | | |
|---|---|---|---|
| 1,702,526 | 2/1929 | Steely. | |
| 1,735,397 | 11/1929 | Hiller | 34—182 X |
| 2,079,280 | 5/1937 | Couch | 34—136 X |
| 2,291,871 | 8/1942 | Bokum et al. | 302—37 |
| 2,374,425 | 4/1945 | De Weerth | 34—182 X |
| 2,559,551 | 7/1951 | Weber | 34—10 X |
| 3,251,695 | 5/1966 | Gidlow | 99—93 X |

FREDERICK L. MATTESON, Jr., *Primary Examiner.*

JAMES W. WESTHAVER, *Examiner.*

D. A. TAMBURRO, *Assistant Examiner.*